(12) United States Patent
Rafanavičius et al.

(10) Patent No.: US 12,278,833 B2
(45) Date of Patent: Apr. 15, 2025

(54) METHOD AND APPARATUS FOR TESTING A MALWARE DETECTION MACHINE LEARNING MODEL

(71) Applicant: UAB 360 IT, Vilnius (LT)

(72) Inventors: Justas Rafanavičius, Vilnius (LT); Aleksandr Ševčenko, Vilnius (LT); Mantas Briliauskas, Vilnius (LT)

(73) Assignee: UAB 360 IT, Vilnius (LT)

(*) Notice: Subject to any disclaimer, the term of this patent is extended or adjusted under 35 U.S.C. 154(b) by 267 days.

(21) Appl. No.: 17/968,637

(22) Filed: Oct. 18, 2022

(65) Prior Publication Data

US 2024/0129329 A1 Apr. 18, 2024

(51) Int. Cl.
*G06F 21/00* (2013.01)
*G06N 20/00* (2019.01)
*H04L 9/40* (2022.01)

(52) U.S. Cl.
CPC ......... *H04L 63/1433* (2013.01); *G06N 20/00* (2019.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 11,146,578 B2* | 10/2021 | Lem | .................. | G06N 5/022 |
| 11,206,275 B2* | 12/2021 | Nabeel | .................. | G06N 20/20 |
| 11,593,485 B1* | 2/2023 | Briliauskas | ........... | G06F 21/566 |
| 11,693,965 B1* | 7/2023 | Briliauskas | ........... | G06F 21/566 |
| | | | | 726/22 |
| 11,763,000 B1* | 9/2023 | Briliauskas | ............ | G06N 20/00 |
| | | | | 726/23 |
| 11,775,642 B1* | 10/2023 | Briliauskas | ............ | G06N 20/00 |
| | | | | 726/23 |
| 11,921,851 B1* | 3/2024 | Vashisht | .................. | G06N 5/01 |
| 11,989,657 B2* | 5/2024 | Chavoshi | ............... | G06N 3/088 |
| 12,067,124 B2* | 8/2024 | Boutselis | ............... | G06F 21/577 |
| 2012/0260342 A1* | 10/2012 | Dube | .................... | G06F 21/564 |
| | | | | 726/24 |
| 2015/0295945 A1* | 10/2015 | Canzanese, Jr. | ........ | G06F 21/55 |
| | | | | 726/23 |
| 2019/0080257 A1* | 3/2019 | Chen | ........................ | G06N 5/04 |
| 2019/0132344 A1* | 5/2019 | Lem | ....................... | G06N 20/00 |
| 2019/0370395 A1* | 12/2019 | Lee | ......................... | G06N 20/00 |
| 2020/0257992 A1* | 8/2020 | Achin | ..................... | G06Q 10/04 |
| 2020/0274894 A1* | 8/2020 | Argoeti | ............... | H04L 63/1433 |
| 2022/0070196 A1* | 3/2022 | Sarkar | ...................... | G06N 5/02 |
| 2022/0121995 A1* | 4/2022 | Chari | ...................... | G06F 21/55 |
| 2022/0366040 A1* | 11/2022 | Marbouti | ............... | G06N 3/045 |
| 2022/0375560 A1* | 11/2022 | Bonageri | ............... | G06N 20/20 |
| 2023/0130651 A1* | 4/2023 | Bosanský | .............. | G06N 3/088 |
| | | | | 726/23 |
| 2023/0244916 A1* | 8/2023 | Stokes, III | ............. | G06N 3/047 |
| | | | | 706/20 |
| 2023/0259621 A1* | 8/2023 | Li | ......................... | G06F 21/563 |
| | | | | 726/23 |

(Continued)

*Primary Examiner* — Jeffery L Williams
(74) *Attorney, Agent, or Firm* — Moser Taboada

(57) ABSTRACT

A method and apparatus for testing a malware detection machine learning model. The method trains a malware detection model using a first dataset containing malware samples from a particular time period. The trained model is then tested using a second dataset that is a time shifted version of the first dataset.

15 Claims, 3 Drawing Sheets

(56) References Cited

U.S. PATENT DOCUMENTS

| | | | |
|---|---|---|---|
| 2023/0388333 A1* | 11/2023 | Sarkar | G06N 5/02 |
| 2023/0409715 A1* | 12/2023 | Nissim | G06F 9/45533 |
| 2023/0421534 A1* | 12/2023 | Alexis | G06N 20/00 |
| 2024/0112803 A1* | 4/2024 | Arora | G16H 50/70 |
| 2024/0129329 A1* | 4/2024 | Rafanavicius | H04L 63/1416 |
| 2024/0273198 A1* | 8/2024 | Vukmirovic | G06F 21/56 |
| 2024/0281808 A1* | 8/2024 | Vouitsis | G06Q 20/401 |
| 2024/0293077 A1* | 9/2024 | Kumar | A61B 5/0077 |

* cited by examiner

METHOD AND APPARATUS FOR TESTING A MALWARE DETECTION MACHINE LEARNING MODEL

FIELD

The present invention relates generally to malware detection, and more particularly, to a method and apparatus for testing a malware detection machine learning model.

BACKGROUND

Malware (malicious software) is ubiquitous on the Internet in the form of ransomware, computer viruses, worms, trojans, spyware, keyloggers, and so on. Malware may be intended to impact the functionality of computers and computer networks by interfering with security, privacy, and/or hardware functionality. Most malware is inadvertently downloaded by a user from the internet. The malware may be hidden in what looks to be a legitimate application or may be attached to a downloaded file.

Malware detection software searches computer files in memory (e.g., persistent memory such as hard drives, solid state memory, memory cards, and the like and/or non-persistent memory such as random access memory) and/or files as they are downloaded to identify malware before it is activated. The process of building malware identification datasets is tedious. The public and private networks must be constantly monitored for new malware or previous malware that has been adapted to avoid detection. Once identified, the malware is scrutinized to determine "samples"—portions of files, entire files, metadata, etc.—to be used to identify the malware. The samples are placed in malware datasets to be used to identify when the malware is embedded in applications or files.

Currently, the datasets are used as databases for comparison to the content and/or metadata of incoming files. A binary, byte sequence or pattern match results in malware detection. More recently, the datasets have been used to train neural networks used by malware detectors (models) in an attempt to learn to detect and classify malware that is not specifically contained in the datasets. In this manner, the malware detector may anticipate new malware. However, currently there are no regimented neural network model testing procedures that ensure the neural networks are correctly functioning.

Therefore, there is a need for improved methods and apparatuses for testing a malware detection machine learning model used for detecting and classifying malware.

SUMMARY

A method and apparatus for testing a malware detection machine learning model. The method trains a malware detection model using a first dataset containing malware samples from a particular time period. The trained model is then tested using a second dataset that is a time shifted version of the first dataset.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
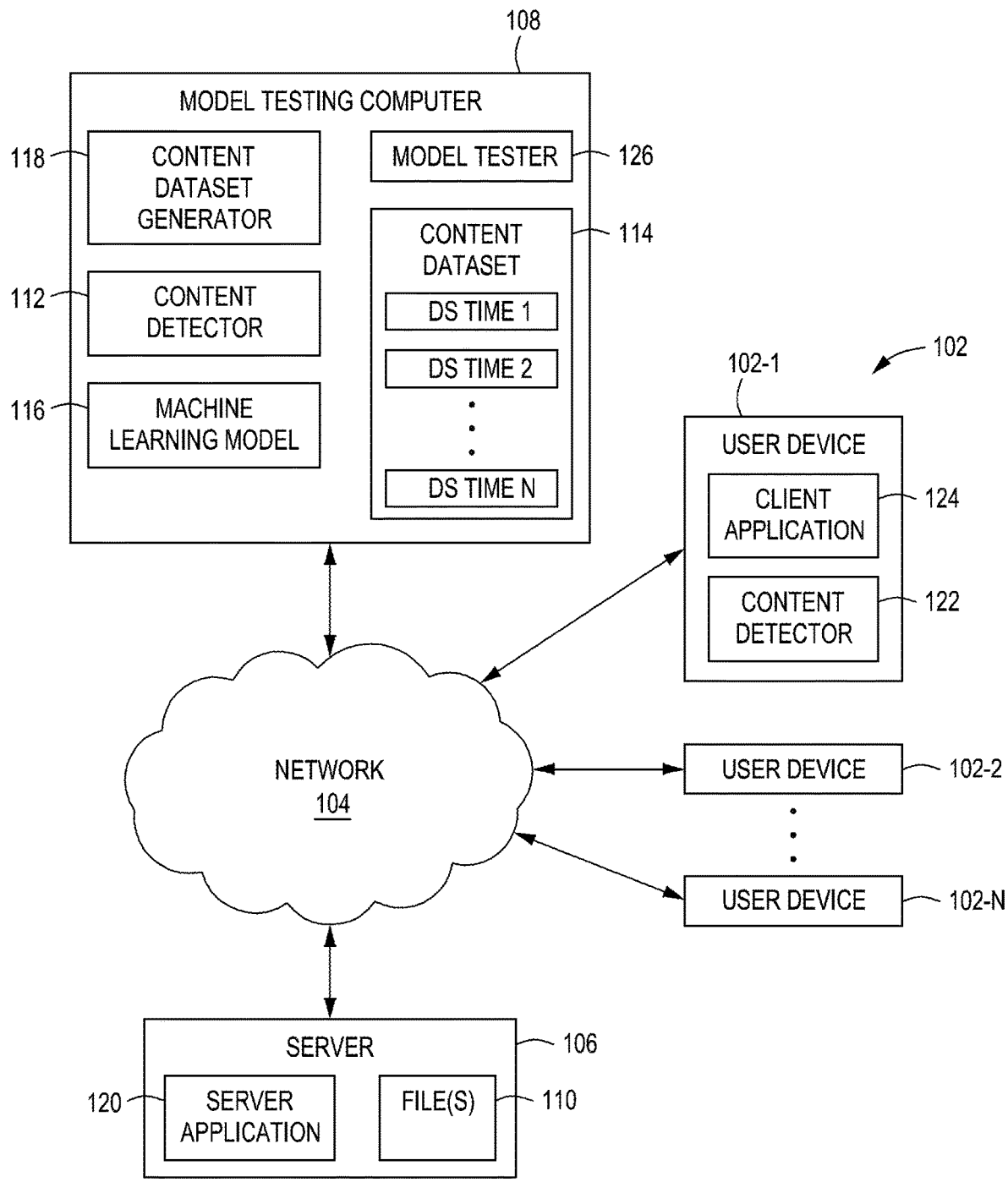
FIG. 1 illustrates an example of a computer system for testing and using a malware detection machine learning model in accordance with at least one embodiment of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, apparatuses, and systems) for testing a malware detection machine learning model. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present invention test a malware detection machine learning model with a malware dataset. The dataset comprises known malware samples collected over a pre-defined period of time (e.g., two years). The malware detection model may be trained with a subset of the malware dataset (e.g., one year). Subsequent to training, the model is tested using the dataset (first dataset) used in training shifted in time by a predefined period (e.g., one month) such that the model is exposed to "new" malware samples contained in the time shifted dataset (second dataset). Quality metrics (e.g., accuracy, execution time, etc.) are collected regarding the ability of the model to identify malware samples contained in the additional malware samples of the time shifted dataset. The model is then allowed to learn from the new malware samples in the time shifted dataset. The training and testing process is repeated for additional time shifted dataset samples (i.e., the dataset is shifted one month during each training/testing procedure) until all the samples in the original dataset are used for training/testing. Details of methods and apparatuses operating in accordance with various embodiments of the invention are described in detail below with respect to the figures.

FIG. 1 illustrates an example of a computer system 100 for generating, testing and using a malware detection dataset in accordance with at least one embodiment of the invention. In FIG. 1, the system 100 comprises at least one user device 102, a server 106, and a computer network 104, (e.g., the Internet) connecting the server 106 to the user devices 102.

The server 106 is a centralized computing device used to execute the application(s) (server application 120) and communicate file(s) 110 to user devices 102. The files 110 may contain malware. The general structure of such a server and/or user device is described in detail below with respect to FIG. 3.

Also connected to the network 104 is a model testing computer 108 configured to generate a malware detection dataset 114 and a machine learning model 116 in accordance with the present invention. The dataset 114 is used to train and test the machine learning model used by a malware detector 112 in accordance with a procedure controlled by the model tester 126. The model testing computer 108 comprises a malware dataset generator 118 that analyzes various malware containing files to identify malware samples to populate a malware dataset 114. The dataset 114 comprises malware samples gathered over a period of time (e.g., two years). The dataset 114 may comprises subsets of data from different time periods, e.g., DS time 1 may contain malware samples gathered over a one year period, DS time 2 may contain malware samples over an additional month, and so on until DS time N containing malware samples from month N. In this manner, the dataset 114 may be time shifted to train and test the machine learning model 116.

User devices 102-1, 102-2, 102-3 ... 102-N (collectively referred to as user devices 102) communicate through network 104 with the server 106. In some embodiments, user device 102 can be any computing device capable of hosting a malware detector 122 (executable software) and a client application 124 (browser or other application that may be affected by malware). User device 102 may comprise any device that is connected to a network, including, for example, a laptop, a mobile phone, a tablet computer, a desktop computer, a smart device, a router, and other network devices. The client application 124 is a well-known application for accessing and displaying web page content, e.g., file(s) delivered by the server 106. Such browsers include, but are not limited to, Safari®, Chrome®, Explorer®, Firefox®, etc. In other embodiments, the client application is any type of application that may be affected by malware.

In operation, the malware detector 122 uses a trained machine learning model (e.g., model 116) that is ported from the model testing computer 108 to the user devices 102. In operation, the model testing computer 108 trains and tests the machine learning model 116. The trained model is then transferred to the malware detector 122 used by each user device 102. The files 110 received by the user devices 102 via the network are applied to the malware detector 122. The malware detector 122 identifies which files contain malware by applying the files to the local machine learning model and removes or isolates the files that are found to contain malware. Occasionally, the model or dataset is updated to reflect additional malware.

Figure 2:
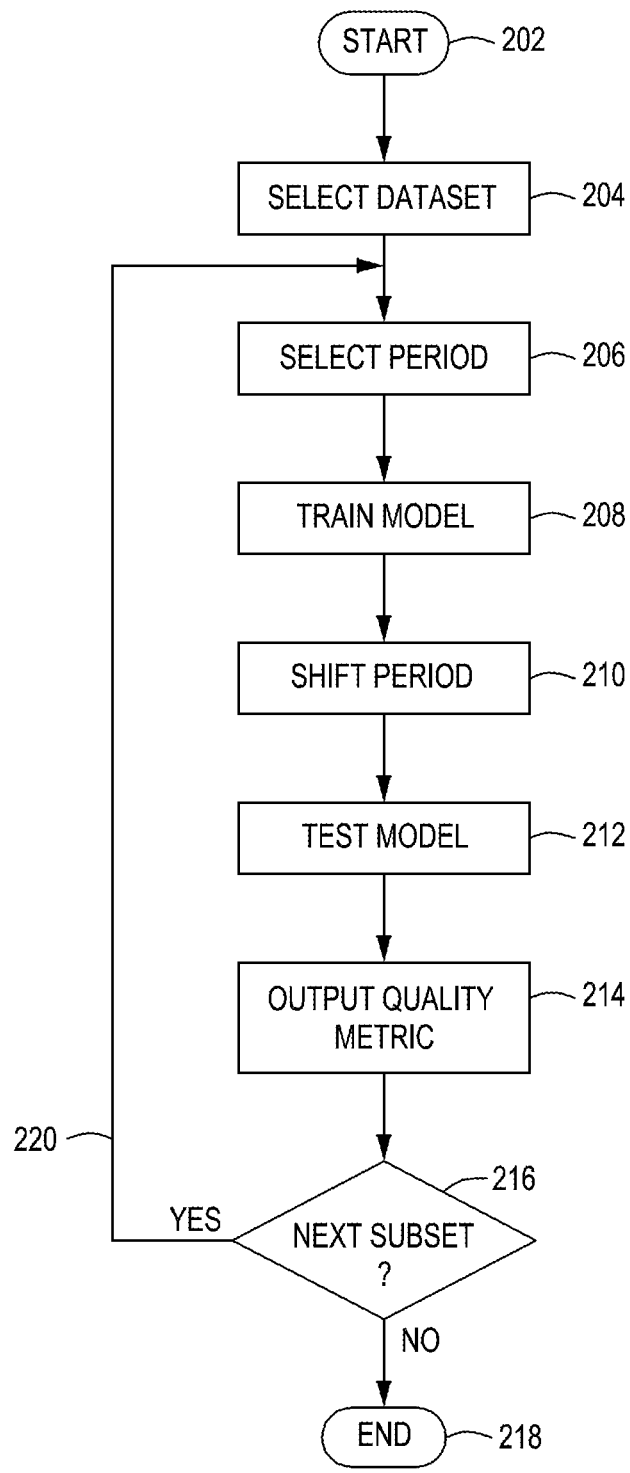
FIG. 2 is a flow diagram of a method for testing a malware detection machine learning model in accordance with at least one embodiment of the present invention.

FIG. 2 illustrates an exemplary flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is a flow diagram of a method 200 for testing the machine learning model 116 of FIG. 1 in accordance with at least one embodiment of the present principles. The method 200 begins at 202 and proceeds to 204 where the method 200 selects a dataset to use for testing (i.e., recalled from memory). At 206, the method 200 selects a period of time (a first period) for the dataset (first dataset) to use to train the machine learning model. For example, but not limited to, the period may be one year of malware samples. In other embodiments, other periods may be used.

At 208, the method 200 trains the model. As is well known in the art, training adjusts the biases and weights of nodes within a neural network such that the trained network (model) is capable of recognizing malware and classifying the detected malware as to its maliciousness. Once the model is trained using the first period dataset, at 210, the method 200 shifts the dataset by a predefined period (e.g., but not limited to, one month) to form a second dataset of a second period. Consequently, the dataset now contains malware samples to which the model has not been exposed.

At 212, the model is tested by applying the second period dataset to the model and allowing the model to identify and classify malware within the dataset. At 214, the method outputs quality metrics regarding the accuracy of the model to recognize the "new" malware samples in the additional period of time. The quality metrics are typically statistical measures such as classification accuracy, mean absolute error, mean squared error, logarithmic loss, confusion matrix and the like.

At 216, the method 200 queries whether the method 200 should continue to train and test the model. If the query is affirmatively answered, the method 200 proceeds along path 220 to 208. If the query is negatively answered, the method 200 ends at 218. If the method 200 is to continue, the method trains the model using the additional data in the second period, then tests the model again with a time shifted dataset, e.g., shifted another month. The method 200 may repeat the train and test procedure until all the data in the dataset has been used to test the model. At this point, assuming the quality metrics indicate the model is adequately trained, the model is ready to be exported to the user devices 102 for use by the malware detector 122 of FIG. 1 to detect malware threats.

Figure 3:
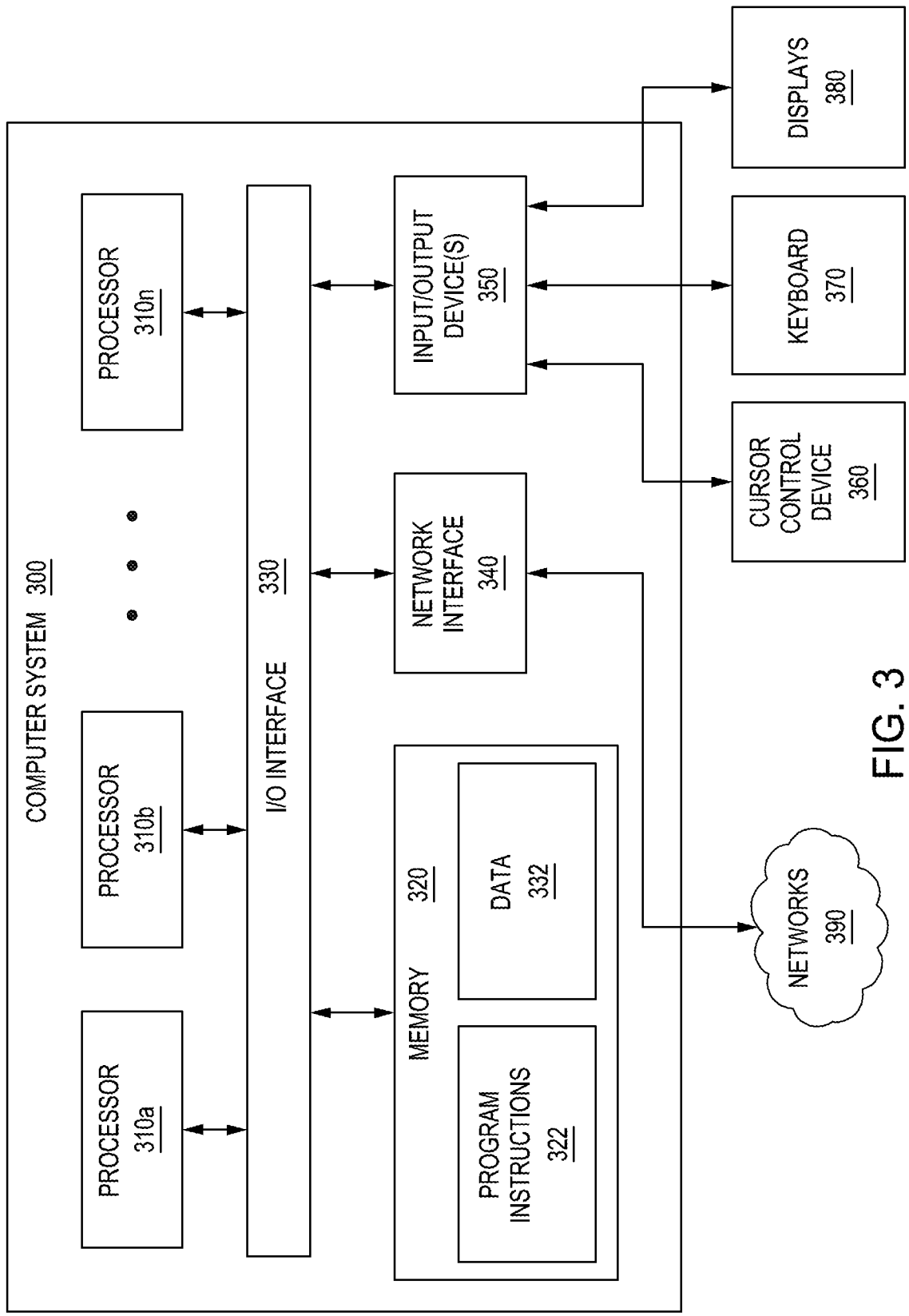
FIG. 3 depicts a high-level block diagram of a computing device suitable for use with embodiments of a system for testing a malware detection machine learning model in accordance with at least one embodiment of the invention.

FIG. 3 depicts a computer system 300 that can be utilized in various embodiments of the present invention to implement the computer and/or the display, according to one or more embodiments.

Various embodiments of method and system for testing a machine learning model, as described herein, may be executed on one or more computer systems, which may interact with various other devices. One such computer system is computer system 300 illustrated by FIG. 3, which may in various embodiments implement any of the elements or functionality illustrated in FIGS. 1 and 2. In various embodiments, computer system 300 may be configured to implement methods described above. The computer system 300 may be used to implement any other system, device, element, functionality or method of the above-described embodiments. In the illustrated embodiments, computer system 300 may be configured to implement the user devices 102, dataset computer 108 and server 106 and implement the method 300 as processor-executable executable program instructions 322 (e.g., program instructions executable by processor(s) 310) in various embodiments.

In the illustrated embodiment, computer system 300 includes one or more processors 310a-310n coupled to a system memory 320 via an input/output (I/O) interface 330. Computer system 300 further includes a network interface 340 coupled to I/O interface 330, and one or more input/ output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of the processors 310 may commonly, but not necessarily, implement the same ISA.

System memory 320 may be configured to store program instructions 322 and/or data 332 accessible by processor 310. In various embodiments, system memory 320 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description on a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Example Clauses

A. A method for testing a machine learning model comprising:
  selecting a first dataset having a first period;
  training a machine learning model using the first dataset;
  time shifting the first dataset to form a second dataset having a second period; and
  testing the machine learning model using the second dataset.

B. The method of clause A, wherein the first dataset comprises malware samples.

C. The method of clauses A or B, wherein, after training, the machine learning model is capable of detecting and classifying malware.

D. The method of clauses A-C, wherein the second dataset comprises malware samples that are not contained in the first dataset.

E. The method of clauses A-D, wherein the first period is the same length as the second period and time shifted by a predefined time period.

F. The method of clauses A-E, further comprising repeating training, time shifting and testing using the second dataset as the first dataset.

G. The method of clauses A-F, further comprising outputting quality metrics representing an accuracy of the machine learning algorithm to detect and classify the second dataset.

H. The method of clauses A-G, further comprising repeating the steps of selecting, training, time shifting and testing for one or more additional datasets.

I. Apparatus for testing a machine learning model comprising at least one processor coupled to at least one non-transitory computer readable medium having instructions stored thereon, which, when executed by the at least one processor, cause the at least one processor to perform operations comprising:

selecting a first dataset having a first period;
training a machine learning model using the first dataset;
time shifting the first dataset to form a second dataset having a second period; and
testing the machine learning model using the second dataset.

J. The apparatus of clause I, wherein the first dataset comprises malware samples.

K. The apparatus of clauses I or J, wherein, after training, the machine learning model is capable of detecting and classifying malware.

L. The apparatus of clauses I-K, wherein the second dataset comprises malware samples that are not contained in the first dataset.

M. The apparatus of clauses I-L, wherein the first period is the same length as the second period and time shifted by a predefined time period.

N. The apparatus of clauses I-M, further comprising repeating training, time shifting and testing using the second dataset as the first dataset.

O. The apparatus of clauses I-N, further comprising outputting quality metrics representing an accuracy of the machine learning algorithm to detect and classify the second dataset.

P. The apparatus of clauses I-O, further comprising repeating the operations of selecting, training, time shifting and testing for one or more additional datasets.

Q. A method for testing a malware detection machine learning model comprising:
selecting a first dataset having a first period, where the first dataset comprises malware samples;
training a machine learning model using the first dataset to detect and classify malware;
time shifting the first dataset to form a second dataset having a second period; and
testing the machine learning model using the second dataset.

R. The method of clause Q, wherein the second dataset comprises malware samples that are not contained in the first dataset.

S. The method of clauses Q or R, wherein the first period is the same length as the second period and time shifted by a predefined time period.

T. The method of clauses Q-S, further comprising repeating training, time shifting and testing using the second dataset as the first dataset.

U. The method of clauses Q-T, further comprising outputting quality metrics representing an accuracy of the machine learning algorithm to detect and classify the second dataset.

What is claimed is:

1. A method for testing a machine learning model comprising:
selecting a first dataset including malware samples collected over a first period;
training a machine learning model using the first dataset;
selecting a second dataset including malware samples collected over a second period having a beginning that is shifted in time by a predefined amount with respect to a beginning of the first period so that the second dataset contains malware samples to which the trained machine learning model has not been exposed and a time-shifted portion of the first dataset; and
testing the machine learning model using the second dataset.

2. The method of claim 1, wherein, after training, the machine learning model is capable of detecting and classifying malware.

3. The method of claim 1, wherein the first period is the same length as the second period and time shifted by a predefined time period.

4. The method of claim 1, further comprising repeating training, time shifting and testing using the second dataset in place of the first dataset.

5. The method of claim 1, further comprising outputting quality metrics representing an accuracy of the machine learning model to detect and classify the second dataset.

6. The method of claim 1, further comprising repeating the steps of selecting, training, time shifting and testing for one or more additional datasets.

7. Apparatus for testing a machine learning model comprising at least one processor coupled to at least one non-transitory computer readable medium having instructions stored thereon, which, when executed by the at least one processor, cause the at least one processor to perform operations comprising:
selecting a first dataset including malware samples collected over a first period;
training a machine learning model using the first dataset;
selecting a second dataset including malware samples collected over a second period having a beginning that is shifted in time by a predefined amount with respect to a beginning of the first period so that the second dataset contains malware samples to which the trained machine learning model has not been exposed and a time-shifted portion of the first dataset; and
testing the machine learning model using the second dataset.

8. The apparatus of claim 7, wherein, after training, the machine learning model is capable of detecting and classifying malware.

9. The apparatus of claim 7, wherein the first period is the same length as the second period and time shifted by a predefined time period.

10. The apparatus of claim 7, further comprising repeating training, time shifting and testing using the second dataset in place of the first dataset.

11. The apparatus of claim 7, further comprising outputting quality metrics representing an accuracy of the machine learning model to detect and classify the second dataset.

12. The apparatus of claim 7, further comprising repeating the operations of selecting, training, time shifting and testing for one or more additional datasets.

13. A method for testing a malware detection machine learning model comprising:
selecting a first dataset having a first period, where the first dataset comprises malware samples;
training a machine learning model using the first dataset to detect and classify malware;
selecting a second dataset including malware samples collected over a second period having a beginning that is shifted in time by a predefined amount with respect to a beginning of the first period so that the second dataset contains malware samples to which the trained machine learning model has not been exposed and a time-shifted portion of the first dataset; and
testing the machine learning model using the second dataset.

14. The method of claim 13, wherein the first period is the same length as the second period and time shifted by a predefined time period.

15. The method of claim 13, further comprising repeating training, time shifting and testing using the second dataset in place of the first dataset.

\* \* \* \* \*